May 19, 1970 — R. R. MYERS — 3,513,066
MOLDING SHEETS FOR ELECTROTYPES
Original Filed Sept. 4, 1959
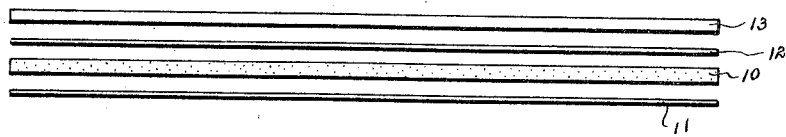
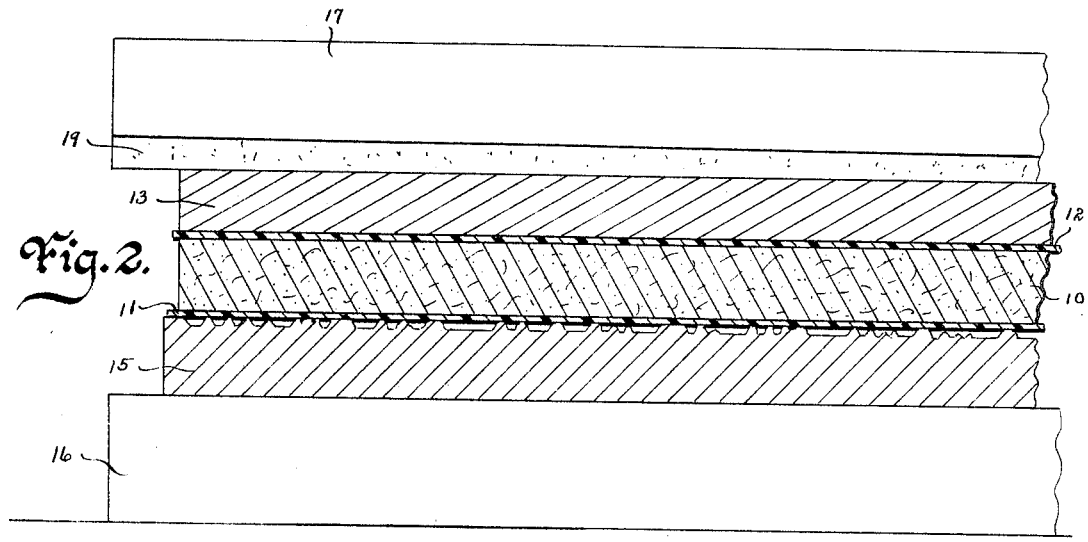
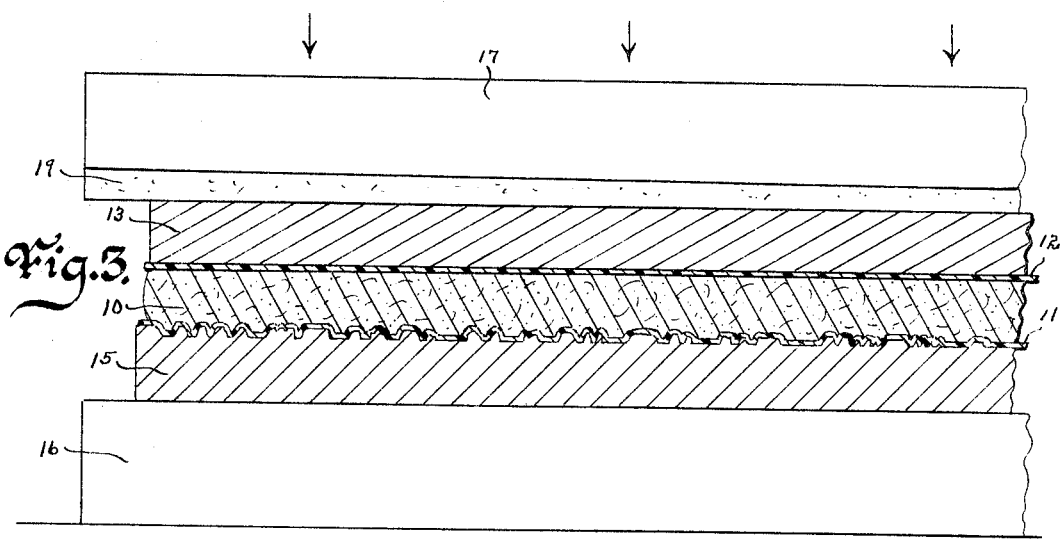
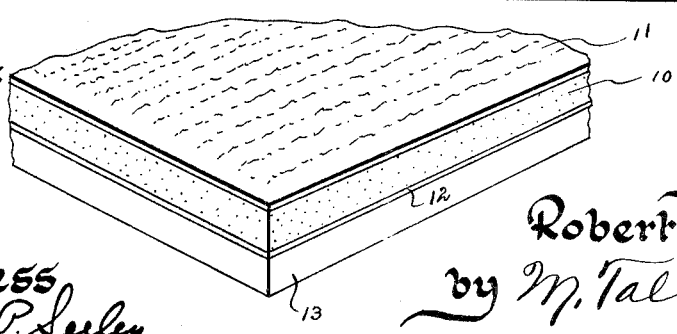
Inventor
Robert R. Myers
by M. Talbert Dick
Attorney
Witness
Edward P. Seeley United States Patent Office
3,513,066
Patented May 19, 1970

3,513,066
MOLDING SHEETS FOR ELECTROTYPES
Robert R. Myers, 904 NE. 2nd St.,
Boca Raton, Fla. 33432
Continuation of application Ser. No. 838,294, Sept. 4,
1959. This application Jan. 28, 1966, Ser. No. 532,821
Int. Cl. B41b 5/02; B41n 1/00
U.S. Cl. 161—165                                    1 Claim This application is a continuation of my co-pending application Ser. No. 838,294 filed Sept. 4, 1959 and now abandoned.

This invention relates to printing and more particularly to matrices or molding sheets for electrotypes.

The production of matrices for direct casting of a stereotype is old. However, herebefore such matrices have been produced by compressing a sheet of paper fibers or a sheet of plastic onto an original templet, but in such processes of producing matrices, the sheet making the molding sheet must be heated at the time the same is pressed onto the original templet. Obviously, these necessary steps of heating and cooling the product are not only costly but time-consuming.

Therefore, one of the principal objects of my invention is to provide a molding sheet that does not require heating at the time it is pressed onto the original templet.

A still further object of this invention is to provide a method of producing electrotypes that is more rapid than that of the production of electrotypes herebefore.

A still further object of my invention is to provide a molding sheet that provides more flexibility in the case of deeper mold cavities.

Still further objects of this invention are to provide molding sheets for use in the production of electrotypes that are economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a side view of the various laminations that make up my molding sheet;

FIG. 2 is a highly enlarged cross sectional view of my molding sheet just prior to its compression onto an original templet;

FIG. 3 is a highly enlarged cross sectional view of my molding sheet as it is being compressed onto the original templet, and FIG. 4 is a highly enlarged perspective view of a portion of my completed matrix ready for use.

As herebefore indicated, my molding sheet is formed from a plurality of laminated sheets. The basic sheet of the laminations is a core sheet designated by the numeral 10 and is of a material such as blotting paper, sulphite paper or like saturated or impregnated with a suitable wax or filler such as micro-crystalline wax, beeswax, paraffin wax or candelilla wax. This sheet 10 should be approximately 0.050 inch thick. Below the sheet 10 is a sheet 11 of thermoplastic polymer material such as vinyl chloride which is approximately 0.015 inch thick. Other such polymer material as polyethylene, polystyrene, Teflon (polytetrafluorethylene), (nylon (polyamide) or the like could be used, but it is important that the plastic material be impervious to the wax, as are those mentioned above. Directly above the sheet 10 is a sheet 12, which is the same as the herebefore described sheet 11. Above the sheet 12 I show a thin sheet 13 which may be of any suitable soft metal such as aluminum or lead. I recommend that this sheet 13 be approximately 0.010 to 0.015 inch thick. I have found that for the production of some types of matrices I can dispense with the sheet 12. I have also found that in certain instances I can dispense with the soft metal sheet 13. However, in the case of templates having deep cavities the inclusion of the soft metal sheet 13 is highly desirable in that it is capable of bending and forming around the various projections of the templet. The sheets 11, 10, 12 and 13 are secured together by any suitable adhesive. A satisfactory adhesive is one made by the Minnesota Mining and Manufacturing Company under the trade name "Cycle Weld." Still another acceptable adhesive is a thermosetting adhesive of the type which adheres readily and comprising essentially a phenolic resin and a polyvinyl acetate resin in the approximate ratio of 3:1, known commercially as Bostik 7008 and manufactured by the B.B. Chemical Company.

When the various laminations of my molding sheet have been secured together, the molding sheet, because of the properties of the various laminations, is placed unheated onto the original templet 15. The jaw 16 of a suitable press will extend below the templet and the upper jaw 17 of the press will be above the top lamination of my molding sheet, as shown in FIG. 2. Particularly if the soft metal sheet 13 is used, the underside of the upper jaw 17 should have a compressible rubber, cork, or like, blanket 19. By using such a resilient blanket, my molding sheet may well have both its upper surface and lower surface bent to conform with the irregularities of the templet. The soft metal sheet 13 will not only give strength and stability to the finished product but will tend to hold the matrix from distortion once it has been pressed onto the templet. On the other hand, if it is desired to have a flat upper surface on the molding sheet, the resilient blanket 19 may be removed and, as herebefore indicated, the soft metal sheet 13 may be eliminated.

If adhesive waxes such as candelilla wax or Zero Wax 6660 (G. S. Ziegler Co.) are used in the sheet member 10, it will not be necessary to use any adhesive for securing the plastic sheets 11 and 12 to the layer 10.

Zero Wax 6660 is understood to contain about 75% microcrystalline wax with the remaining 25% being made up of a mixture of aromatic and aliphatic fatty acid ester waxes of animal and vegetable origin.

From the foregoing it will be appreciated that I have provided a cold type molding sheet that will successfully produce desirable matrices. After my molding sheet has been compressed onto the templet, it is removed and ready for use in the making of electrotypes, as shown in FIG. 4.

Some changes may be made in the construction and arrangement of my method of and means for producing molding sheets for electrotypes without departing from the real spirit and purpose of my invention, and it is my intention to cover by my claim, any modified forms of structure or use of mechanical equivalents which may be reasonably included within its scope.

I claim:
1. A new article of manufacture, a laminated sheet for producing a matrix, comprising
   a fibrous paper sheet of wax-impregnated fibers, the wax of said wax-impregnated fibers consisting of one from a group of micro-crystalline wax, beeswax, paraffin wax and candelilla wax,
   first and second thin sheets of flexible thermoplastic polymer material on opposite sides of said fibrous sheet, said sheets of polymer material being coextensive and in direct engagement with said fibrous sheet and being secured thereto, said sheets of polymer material being impervious to said wax of said wax-impregnated fibers and being selected from the group consisting of vinyl chloride, polyethylene, polystyrene, polytetrafluoroethylene and polyamide,
a reinforcing metal sheet secured to and being coextensive with one of said sheets of polymer material, and the exposed surface of the other of said sheets of polymer material being adapted to receive printing,
said fibrous sheet being approximately 0.050 inch thick; said sheets of polymer material being approximately 0.015 inch thick, and said reinforcing metal sheet being between 0.010 and 0.015 inch thick.

References Cited

UNITED STATES PATENTS

| | | | |
|---|---|---|---|
| 2,444,443 | 7/1948 | Hesselroth | 161—234 |
| 2,632,722 | 3/1953 | Libberton | 204—281 |
| 3,010,860 | 11/1961 | Eberl | 161—235 |

ROBERT F. BURNETT, Primary Examiner

R. J. ROCHE, Assistant Examiner

U.S. Cl. X.R.

101—395; 161—400, 235, 214, 216